(12) United States Patent
Feldkamp et al.

(10) Patent No.: US 8,858,890 B2
(45) Date of Patent: Oct. 14, 2014

(54) FLUE GAS PURIFICATION SYSTEM

(75) Inventors: Markus Feldkamp, Bottrop (DE); Rüdiger Baege, Essen (DE); Markus Dickamp, Bochum (DE); Joachim Greimann, Essen (DE); Christian Moser, Essen (DE)

(73) Assignee: Hamon Enviroserv GmbH, Essen (DE)

( * ) Notice: Subject to any disclaimer, the term of this patent is extended or adjusted under 35 U.S.C. 154(b) by 262 days.

(21) Appl. No.: 13/378,879

(22) PCT Filed: Jun. 16, 2010

(86) PCT No.: PCT/EP2010/003618
§ 371 (c)(1),
(2), (4) Date: Dec. 16, 2011

(87) PCT Pub. No.: WO2010/145814
PCT Pub. Date: Dec. 23, 2010

(65) Prior Publication Data
US 2012/0087837 A1 Apr. 12, 2012

(30) Foreign Application Priority Data
Jun. 18, 2009 (EP) .................................... 09007992

(51) Int. Cl.
| | |
|---|---|
| *B01D 53/00* | (2006.01) |
| *B01D 53/12* | (2006.01) |
| *B01D 53/74* | (2006.01) |
| *B01D 53/50* | (2006.01) |
| *F23J 15/02* | (2006.01) |
| *B01D 53/83* | (2006.01) |

(52) U.S. Cl.
CPC .............. *B01D 53/83* (2013.01); *B01D 53/508* (2013.01); *F23J 15/02* (2013.01); *B01D 53/504* (2013.01); *F23J 2219/60* (2013.01)
USPC ............................ 422/168; 422/139; 422/145

(58) Field of Classification Search
CPC ........ B01D 53/00; B01D 53/12; B01D 53/74; B01D 53/83
USPC ........................... 422/139, 145, 147, 168, 176
See application file for complete search history.

(56) References Cited

U.S. PATENT DOCUMENTS

| | | | |
|---|---|---|---|
| 2004/0195402 A1* | 10/2004 | Joshi | 239/601 |
| 2008/0159922 A1 | 7/2008 | Sauer et al. | |
| 2008/0308956 A1 | 12/2008 | Maier et al. | |
| 2009/0121038 A1* | 5/2009 | Wurz | 239/8 |

FOREIGN PATENT DOCUMENTS

| | | |
|---|---|---|
| AT | 404 565 B | 12/1998 |
| CN | 101 402 019 A | 4/2009 |

(Continued)

OTHER PUBLICATIONS

Graf—EP0875274 A2, machine translation from Espacenet. Nov. 4, 1998.*

*Primary Examiner* — Walter D Griffin
*Assistant Examiner* — Jelitza Perez
(74) *Attorney, Agent, or Firm* — Gudrun E. Huckett

(57) ABSTRACT

The aim of the invention is to devise a flue gas purification system which allows the use of only one absorber even for large systems. The flue gas purification system according to the invention comprises a fluidized-bed reactor having a flue gas inlet unit and a flue gas outlet unit, the flue gas outlet unit having at least two flue gas outlets which are arranged at an angle to each other.

7 Claims, 4 Drawing Sheets

(56) References Cited

FOREIGN PATENT DOCUMENTS

| | | |
|---|---|---|
| CN | 101 417 207 A | 4/2009 |
| DE | 197 14 337 A1 | 10/1998 |
| DE | 100 58 548 C1 | 10/2001 |
| EP | 875274 A2 * | 11/1998 |
| EP | 1 629 880 A | 3/2006 |
| WO | 2006/032288 A | 3/2006 |

* cited by examiner

FLUE GAS PURIFICATION SYSTEM

BACKGROUND OF THE INVENTION

The present invention pertains to a flue gas purification system with a fluidized bed reactor that features a flue gas inlet unit and a flue gas outlet unit.

Flue gas purification systems are extensively known from the prior art. A system of this type is described, for example, in WO 2006/032288 A1. Such systems are used for carrying out methods for the separation of noxious gases such as, for example, HCl, HF or SO2. Dioxins, furanes and heavy metals such as, for example, mercury can also be effectively separated if so-called sorbents such as hearth-type furnace coke, activated carbon or the like is also added. Fluidized bed reactors, into which the flue gas to be purified is introduced via a flue gas inlet unit, may be used for carrying out this method. This unit usually consists of a pipeline that arrives from the boiler and features one or more outlets into the reactor area. A sorbent is placed or introduced into the reactor. A fluidized bed is then conventionally formed. Reactors may be operated with circulating fluidized beds or entrained beds. The flue gas and the sorbent react with one another and the noxious gases are separated from the flue gas in this fashion. The entire gas, i.e., the flue gas with the entrained separation residues and sorbent residues, is transferred into a downstream separation unit that usually consists of filter units via a flue gas outlet unit. In the filter unit, the separation residues are separated from the flue gas and the flue gas is subsequently released. The separation residues are partially returned to the fluidized bed reactor or disposed of and reused.

In large systems with volumetric flue gas flows greater than 2,000,000 Nm3/h, it is necessary to operate several absorbers on the inlet side because the flow processes against and through the absorption zone, the distribution of solid matter, the temperature distribution, as well as pressure losses and, if applicable, soiling and depositing tendencies require such a parallel operation.

In large systems with, for example, volumetric flue gas flows greater than 2,000,000 Nm3/h, it is furthermore necessary to operate two or more flue gas purification systems in parallel because the capacity of the filter units arranged downstream of the reactor is limited. Such filter units consist, for example, of conventional bag filter units, electric filters or the like.

Based on the known prior art, the present invention aims to solve the problem of additionally developing a flue gas purification system of the initially cited type in such a way that the use of only one absorber also suffices in large systems.

SUMMARY OF THE INVENTION

A flue gas purification system wherein the flue gas outlet unit features at least two flue gas outlets that are arranged angular to one another is proposed as the technical solution to this problem. Other advantages and characteristics result from the dependent claims.

According to the invention, the flue gas outlet unit features at least two flue gas outlets that are arranged angular to one another. In this way, the waste gas flow routed from the reactor to the filter units can be divided and introduced into different filter assemblies. This results in significant advantages because the flow against the required downstream filters is significantly improved. Bag filters, electric filters or similar filters can be used at this location. The arrangement of the filters can be optimized in a space-saving fashion and solid matter can be homogenously distributed in the flows to the filters. This results in lower pressure losses of the absorber and said absorber does not have any soiling and depositing tendencies in the head area.

The inventive flue gas outlet unit is advantageously realized in the form of a hood with two outlet pipe connections and attached to the reactor.

According to the invention, it is proposed that the flue gas inlet unit of the reactor features at least two flue gas inlets that are arranged angular to one another. In this way, the reactor can be acted upon with different flue gas flows. An improved flow against and through the absorption zone is achieved. A nozzle unit is advantageously arranged directly downstream of the flue gas inlet. This results in an improved flow through the system. The nozzle unit may feature a lateral solid matter feed unit such that a homogenous distribution of solid matter can be realized in the absorber. All in all, the temperature distribution is improved and only little water needs to be injected in order to cool the crude gas flow. The pressure losses in the absorber are also reduced. According to another advantageous proposal of the invention, lateral solid matter inlets are provided on individual nozzles or on all nozzles.

The basic requirement for a sensible and economical operation and a long service life of corresponding systems or corresponding reactors is the largely uniform distribution of gas and solids over the entire reactor volume. However, this is difficult in large systems with volumetric flue gas flows greater than 2,000,000 Nm3/h if only one solid matter feed, only one gas vent and/or only one gas inlet is provided. The invention accordingly ensures that an adequate and uniform gas/solid matter distribution can be achieved over the entire reactor volume with simple means.

According to one particularly advantageous proposal, nozzles with different cross sections are used in the nozzle unit. This not only refers to the shape, but also to the diameter. For example, nozzles with a round cross section and different diameters may be used, wherein nozzles with different cross-sectional shapes such as polygonal, round or similar shapes or any combinations of the described options may also be used.

In this way, the units can be fluidically optimized with respect to the flow against and through said units and an absorber in the form of a single absorber can also be advantageously used in large systems.

According to another advantageous proposal, a steam humidification is carried out. The experts have different opinions on the concrete effect of the water in the reactor. According to the most likely point of view, the partial pressure of the water in the gas is important for achieving correspondingly intense effects. In this case, the water does not fulfill any cooling functions. In light of this aspect, a humidification with steam is particularly advantageous because a very good distribution and an adequate partial pressure effect are achieved. The uniform distributions of gas and solid matter, if applicable also water, over the entire reactor volume provide the particular advantage of achieving very good flows through the system. This prevents unnecessary deposits and caking of the reactor, wherein soiling and depositing tendencies also do not occur in the head area.

The solid matter is usually injected into the reactor under pressure, namely into the lateral solid matter feed of the nozzle unit in accordance with the invention. This nozzle unit preferably has a round or rectangular cross section and is fitted with different nozzles such that an optimal solid matter distribution, an optimal humidification and an optimal temperature distribution can be achieved in this fashion.

The invention provides an option for realizing optimizations of a flue gas purification system with manageable financial expenditures, wherein said optimizations make it possible to also use only one fluidized bed reactor in large systems for significant volumetric flue gas flows. This results in significant economical advantages and technical optimization options.

BRIEF DESCRIPTION OF THE DRAWINGS

Other advantages and characteristics of the invention result from the following description that refers to the figures. In these figures.

DESCRIPTION OF THE PREFERRED EMBODIMENTS

Figure 1:
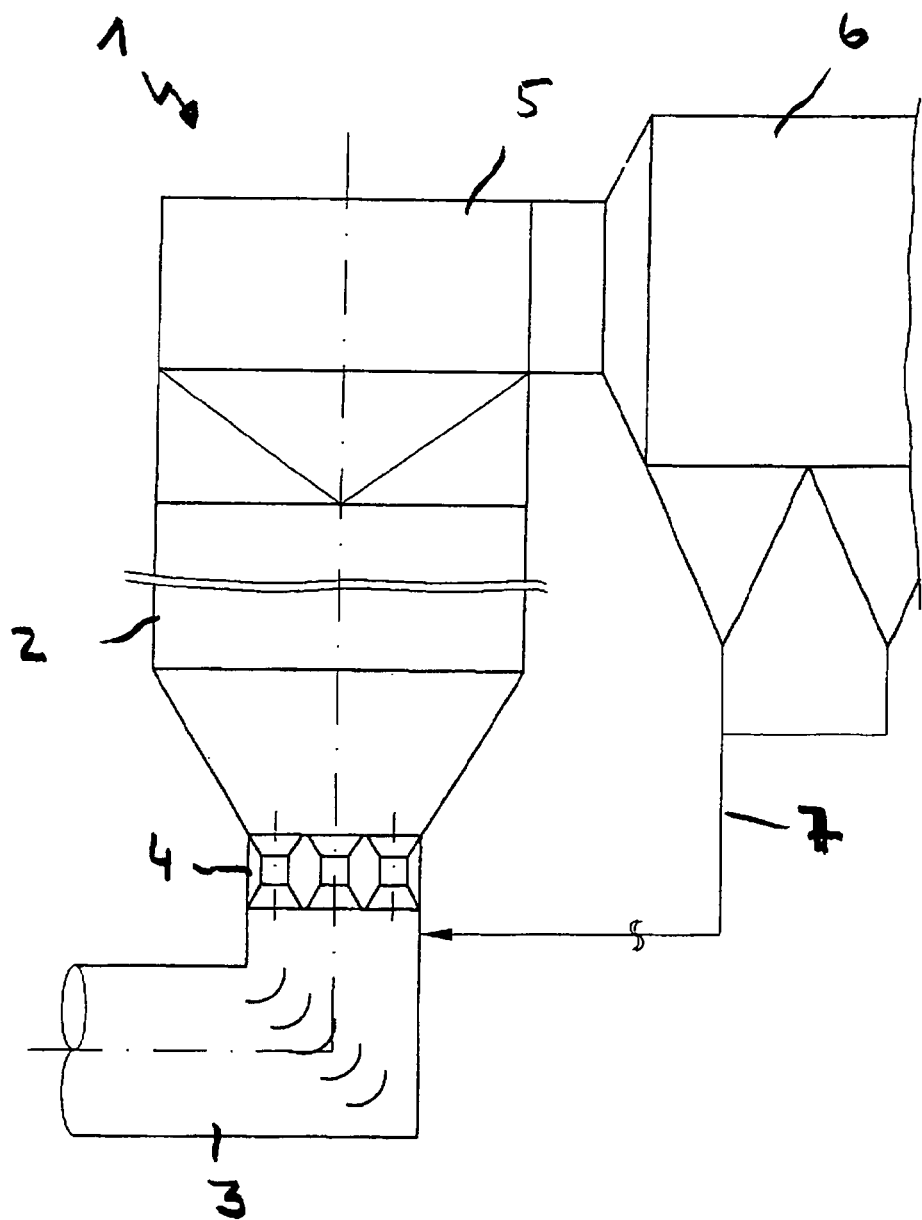
FIG. 1 shows a schematic representation of a flue gas purification system according to the prior art.

In the flue gas purification system 1 according to the prior art shown in FIG. 1, a fluidized bed reactor 2 is charged with flue gas. This flue gas is introduced into the fluidized bed reactor 2 from a boiler via a line 3 and nozzles 4. The flue gas to be purified flows through a sorbent placed into the fluidized bed reactor. A circulating fluidized bed forms in dependence on the flow speeds and the introduced particle sizes. The reaction between the flue gas or the noxious matter contained therein and the sorbent takes place in the fluidized bed. An outlet unit 5, through which the flue gas/sorbent mixture is transferred from the fluidized bed reactor 2 into a filter unit 6, is situated on the upper end of the fluidized bed reactor 2 referred to the flow direction of the flue gas to be purified. The filter unit 6 contains, for example, bag filters or electrid filters or combinations thereof. Sorbent fractions filtered out of the flue gas can be returned into the reactor 2 via return lines 7. The purified flue gas is then routed through not-shown additional flues.

From the inlet line 3 to the outlet line 5, the flue gas passes partially angular and partially round cross sections. The flow-through conditions, as well as the tendency to form deposits and therefore to possibly reduce the cross sections over an extended period of time, essentially depend on how uniformly the gas and the solid matter are distributed over the entire reactor volume. In larger systems with, for example, volumetric flue gas flows greater than 2,000,000 Nm3/h, the flow units known from the prior art such as inlet lines, outlet lines, nozzles, cross-sectional ratios and the like cannot ensure a uniform distribution and therefore also not prevent deposits on and soiling of the reactor.

Figure 2:
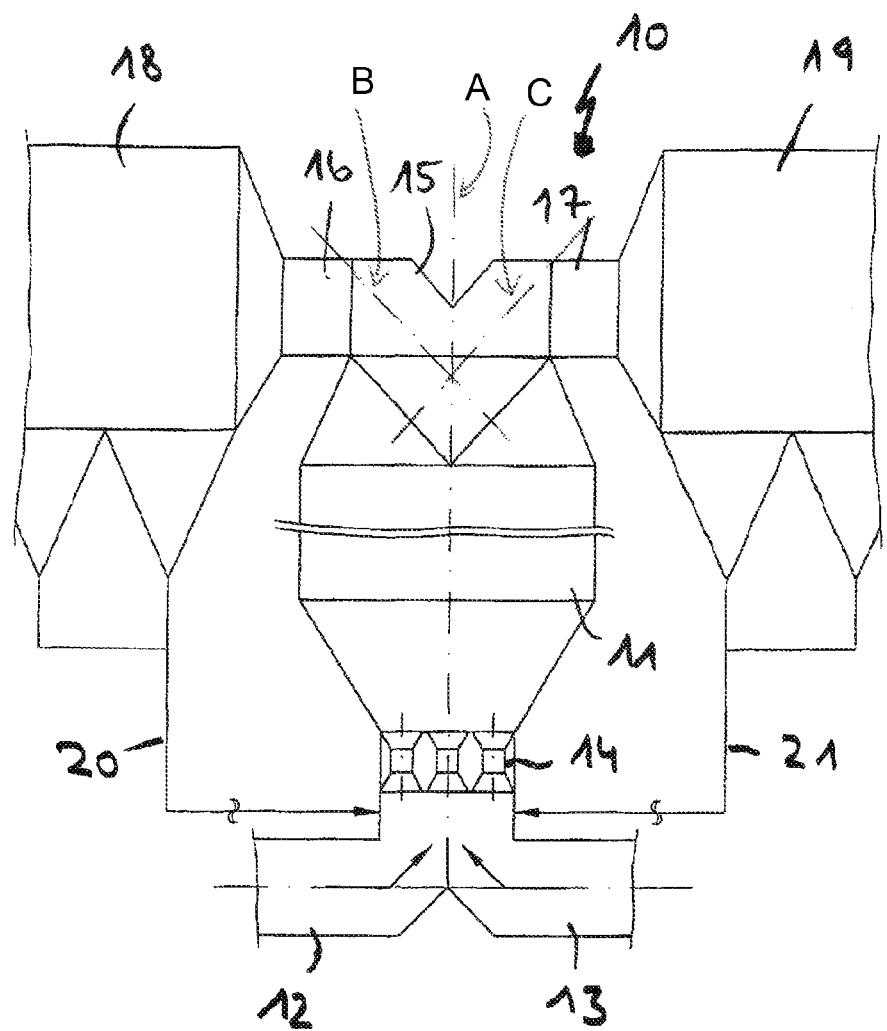
FIG. 2 shows a schematic representation of a first embodiment of a flue gas purification system according to the invention.

In the exemplary embodiment of an inventive flue gas purification system 10 illustrated in FIG. 2, the system comprises a fluidized bed reactor 11 having a central vertical axis A. This fluidized bed reactor features a nozzle unit 14 in the inflow area. In contrast to the prior art, the exemplary embodiment shown features two inlet lines 12, 13 and two outlet lines 16, 17. The outlet and inlet lines shown are arranged angular to one another. For example, the lines may arrive from a large (not-shown) boiler along corresponding routes or from different boilers in order to achieve a correspondingly high performance. In this respect, correspondingly large systems can also be operated with only one fluidized bed reactor.

After the flue gas has passed the nozzle area 14, it reaches the fluidized bed or, at high speeds, the entrained bed in the reactor 11. At this location, it is conventionally brought in contact with the sorbent and exits the reactor through the hood area 15 in two outlet lines 16, 17 that are arranged angular with central axes B, C diverging relative to one another and relative to the central vertical axis A and are connected to different filter units 18, 19 with corresponding return lines 20, 21 and not-shown discharge lines.

For a person skilled in the art, it is obvious that these arrangements provide different advantages and can be used in different combinations. For example, a reactor may be charged via one feed line and divide the gas flow into two or more discharge lines that lead into different filter units in the upper hood area. This has the advantage of making it possible to achieve a significant improvement in the flow through the system and therefore to homogenize the distribution of the gas and the solid matter. In addition, the entire system is not limited by the capacity of the filter system. In other respects, the filters can be compactly positioned in accordance with structural engineering aspects such that corresponding constructional advantages are attained.

Conversely, a corresponding fluidized bed reactor can be charged by means of two or more feed lines, wherein the gases pass the nozzle unit and the fluidized bed reactor itself and are then introduced into a filter unit through only one discharge line. Such an arrangement may be practical for the parallel operation of smaller boilers or also for very large boiler systems, for example, if sufficient space for realizing the corresponding filter capacities is available. In this case, the use of only one reactor may also completely suffice for achieving a correspondingly positive flow through the system without having to worry about unnecessary deposits or caking.

Figure 3:
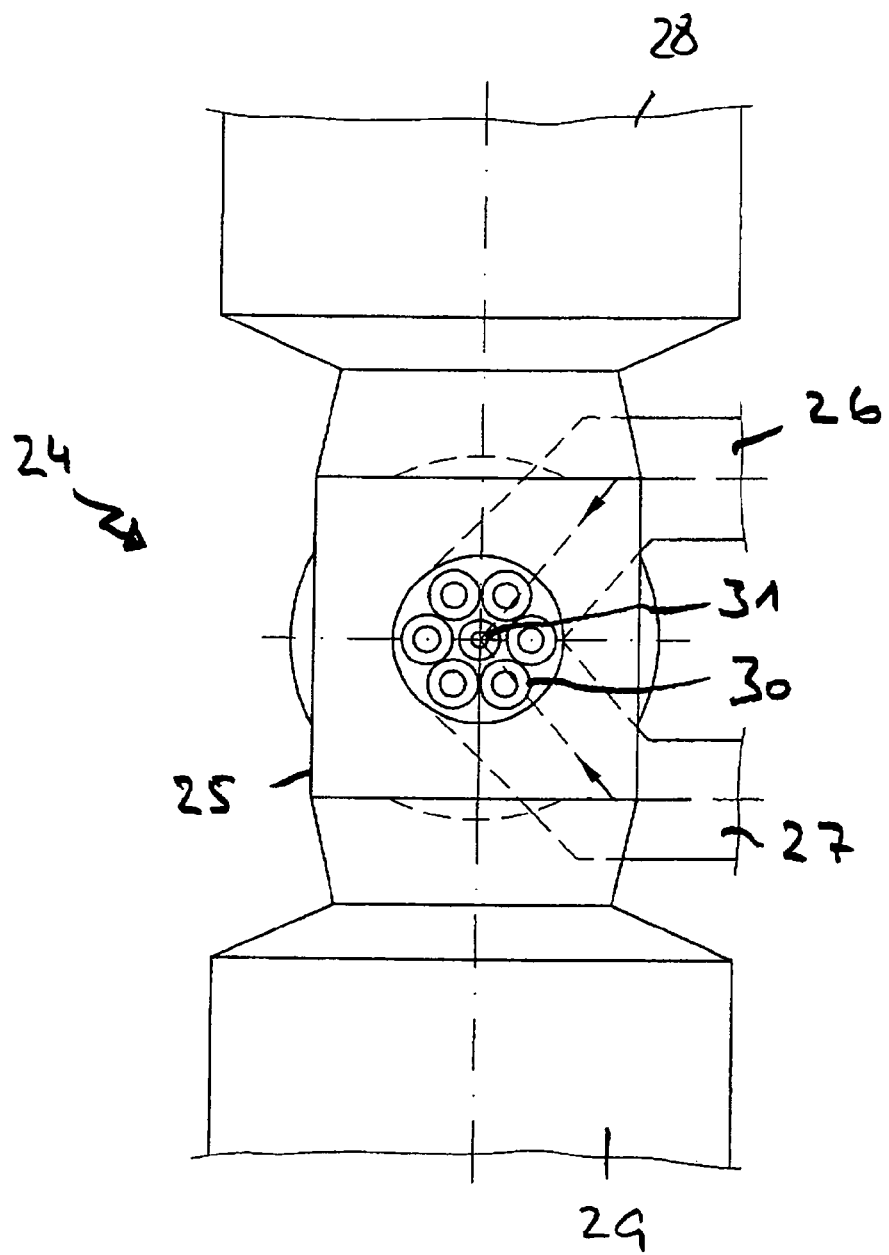
FIG. 3 shows a schematic representation of a first embodiment of the nozzle area of an inventive flue gas purification system.
Figure 4:
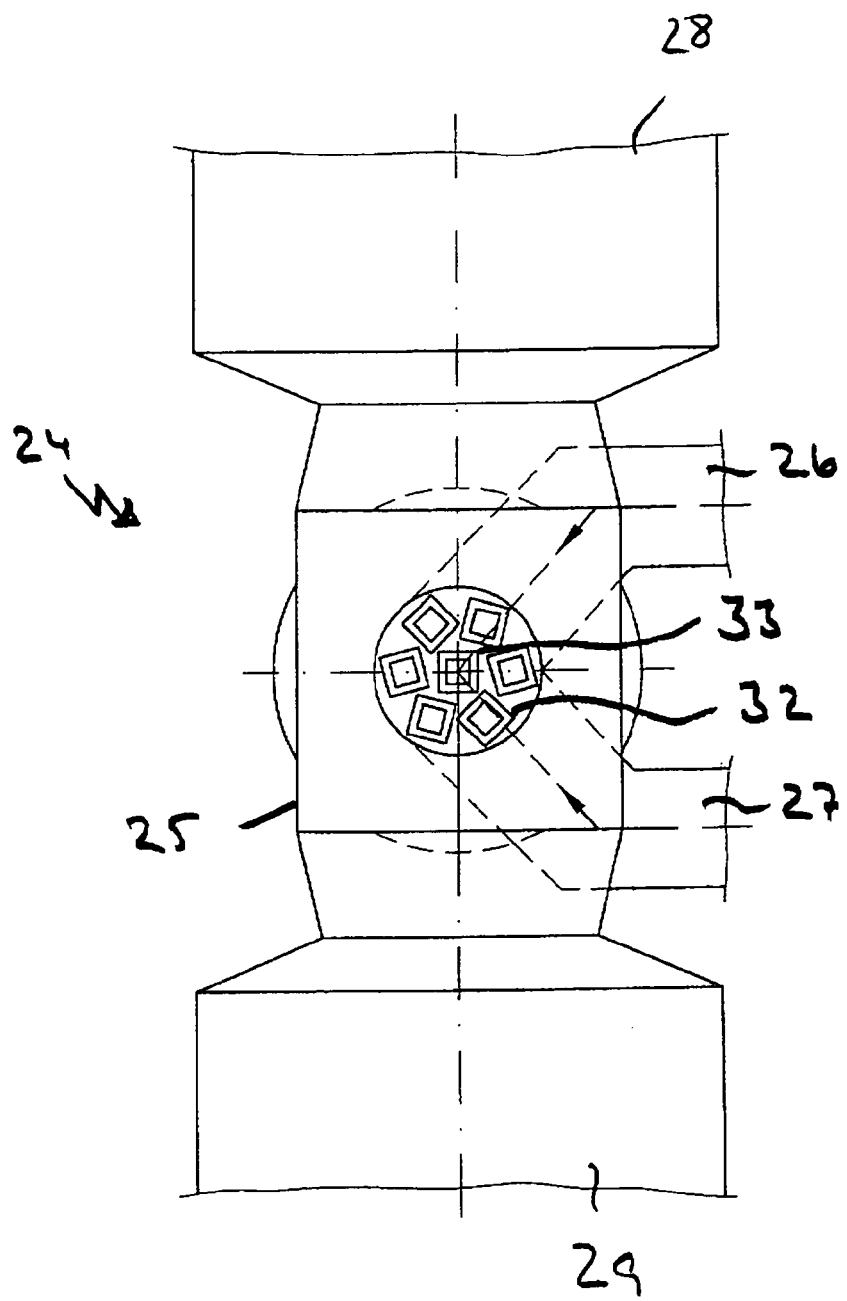
FIG. 4 shows a schematic representation of a second embodiment of the nozzle area of an inventive flue gas purification system.

FIGS. 3 and 4 practically show a top view of the system illustrated in FIG. 2, wherein the nozzle area is illustrated in the form of an exploded view. In FIGS. 3 and 4, identical elements are identified by the same reference symbols. Two feed lines 26, 27 are arranged angular to one another and respectively lead into the area of the nozzles 30, 31 in FIG. 3 or the nozzles 32, 33 in FIG. 4. It is possible to ascertain that a nozzle set 30, 31 may consist of nozzles with different diameters, wherein the nozzle set 32, 33 consists of nozzles with different cross sections. The shapes may also be vaned as indicated by the discrepancy between FIGS. 3 and 4. Mixed shapes and diameter variations in one nozzle unit also fall under the scope of the invention. The nozzle units are chosen such that an optimal flue gas flow into the fluidized bed reactor can be achieved in order to thusly realize optimal flow-through conditions therein. The figures do not show the solid matter inlets that are laterally arranged in the area of the nozzles 30, 31, 32, 33 and make it possible to laterally introduce the sorbent into the nozzles and therefore into the flue gas flow. After flowing through the fluidized bed reactor, the flue gases exit the area toward both sides through the discharge lines and are routed into the area of the filters 28, 29.

It goes without saying that the exemplary embodiments shown only serve for elucidating the invention and are not restrictive. It is not only possible to combine different numbers from one or more inlet lines with different numbers of one or more outlet lines, but also to combine different numbers of nozzles with different diameters and shapes with solid matter inlets. In addition, a humidification by means of steam may also be carried out in order to achieve an optimal partial pressure of the water in the reactor area. These structural devices are also not illustrated in the figures and realized conventionally.

List Of Reference Symbols

1 Flue gas purification system
2 Fluidized bed reactor
3 Feed line
4 Nozzle unit
5 Outlet area
6 Filter
7 Return line
10 Flue gas purification system
11 Fluidized bed reactor
12 Feed line
13 Feed line
14 Nozzle unit
15 Outlet area
16 Discharge line
17 Discharge line
18 Filter
19 Filter
20 Return line
21 Return line
24 Flue gas purification system
25 Outlet area
26 Feed line
27 Feed line
28 Discharge line/filter
29 Discharge line/filter
30 Nozzle
31 Nozzle
32 Nozzle
33 Nozzle

What is claimed is:

1. A flue gas purification system comprising:
a fluidized bed reactor having a central vertical axis;
a flue gas inlet unit connected to the fluidized bed reactor and a flue gas outlet unit connected to the fluidized bed reactor at an end of the fluidized bed reactor opposite the flue gas inlet unit in a direction of the central vertical axis;
wherein the flue gas outlet unit comprises at least two flue gas outlets each having a center axis, wherein the at least two flue gas outlets are connected to the fluidized bed reactor such that the center axes of the at least two flue gas outlets diverge relative to the central vertical axis of the fluidized bed reactor and diverge relative to each other.

2. The flue gas purification system according to claim 1, wherein the flue gas outlet unit is a hood with at least two outlet pipe connections.

3. The flue gas purification system according to claim 1, wherein the flue gas inlet unit features at least two flue gas inlets that are arranged angular to one another.

4. The flue gas purification system according to claim 1, wherein a nozzle unit is arranged directly downstream of the flue gas inlet unit and fitted with nozzles.

5. The flue gas purification system according to claim 4, wherein the nozzle unit features at least one lateral solid matter inlet.

6. The flue gas purification system according to claim 5, wherein a lateral solid matter inlet is realized on several nozzles.

7. The flue gas purification system according to claim 4, wherein the nozzles have different cross sections.

\* \* \* \* \*